United States Patent [19]
Watterback

[11] 3,841,177
[45] Oct. 15, 1974

[54] TORQUE-LIMITING GRIPPING DEVICE FOR A SCREW MEANS

[75] Inventor: Paul Gunnar Watterback, Stockholm, Sweden

[73] Assignee: Arbman Development AB, Stockholm, Sweden

[22] Filed: Apr. 17, 1973

[21] Appl. No.: 352,032

[30] Foreign Application Priority Data
Aug. 21, 1972 Sweden.............................. 8938/72

[52] U.S. Cl. ................................. 81/52.4 R, 85/61
[51] Int. Cl. .................................................. B25b
[58] Field of Search............ 81/52.5, 52.4 R; 85/61, 85/62

[56] References Cited
UNITED STATES PATENTS

| | | | |
|---|---|---|---|
| 2,605,804 | 8/1952 | Woodling | 85/62 X |
| 2,605,805 | 8/1952 | Woodling | 85/62 X |
| 3,237,507 | 3/1966 | Modrey | 81/52.5 |
| 3,602,976 | 9/1971 | Grube | 85/61 X |
| 3,728,933 | 4/1973 | Grube | 85/61 |

*Primary Examiner*—James L. Jones, Jr.
*Attorney, Agent, or Firm*—Cushman, Darby & Cushman

[57] ABSTRACT

A torque limiting gripping device for a bolt head or a nut comprises a grip element threaded on the bolt head or nut and provided with external gripping surfaces for a wrench or other tool. The free end of the bolt head or nut is provided with an abutment against which the grip element is screwed during manufacture to produce pre-stressed engagement. When using the torque-limiting bolt or nut thus produced the bolt or nut is tightened by means of the grip element, which begins to rotate on the bolt head or external nut threads when the rated torque, which is about equal to the pre-stress torque, is exceeded.

10 Claims, 1 Drawing Figure

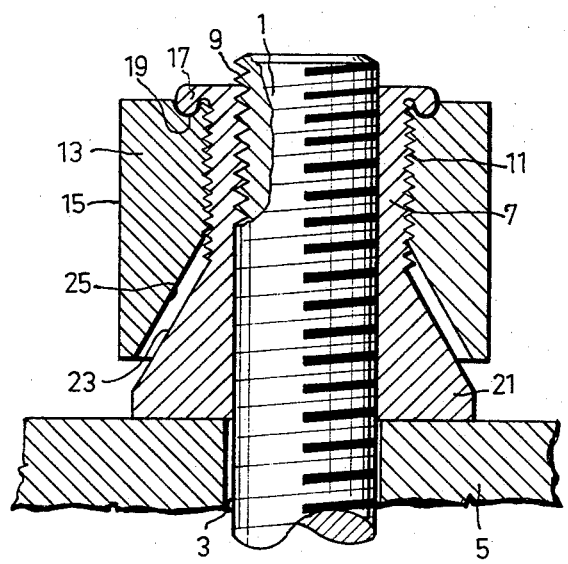

TORQUE-LIMITING GRIPPING DEVICE FOR A SCREW MEANS

The present invention relates to a torque limiting gripping device for a screw means, said screw means being surrounded by a gripping body which for rotation of the screw means transfers torque to the same up to a predetermined value.

Torque limiting devices in the form of torque-limiting nuts are known in which the torque between an outer gripping body and an inner body working in conjunction with the screw is transferred by means of resilient ratchet washers or shear pins. The constructions are complicated and expensive. The object of the present invention is to achieve a simplified torque-limiting device which, in addition to the screw means, comprises essentially only one additional part but which also permits setting of the predetermined torque value, the rated torque, with good precision within a broad range.

According to the invention this is achieved in the above-mentioned device in that the screw means is provided with an outer thread onto which the gripping body is screwed and bears against a stop on the screw means with such pre-stress that the gripping body loosens from the stop and moves on the outer thread of the screw element when said predetermined torque on the screw means is reached.

The pre-stressing between the gripping body and the screw means is advantageously created by the gripping body being screwed on the outer thread of the screw into contact with the stop, thus in the opposite direction to the direction of rotation when the screw means is tightened. The torque with which the gripping body is tightened against the stop determines the rated torque and lies in the vicinity of the same. The difference between said torque and the rated torque is dependent on a number of factors such as choice of materials, pitch, etc. However the relation can be easily determined by experiment.

In the case where the screw means is a screw, the screw head is provided with said outer thread. If the screw means is a nut, then said nut is constructed as a sleeve with an internal working thread and is provided on the outside with said outer thread.

According to one preferred embodiment of the invention, said outer thread of the screw means has less of a pitch than the working thread of the screw means. When the rated torque is reached in tightening the screw means, the connection between the screw means and the gripping body will loosen slowly so that those disadvantages are avoided which can occur when the connection is suddenly completely released.

The stop is preferably placed at the outer end of the screw means and is preferably constructed as a thread portion of the outer thread of the screw means with increasing diameter, for example by conical widening of the end of the screw means. Alternatively the stop can be formed by bending over or rolling the end of the screw means or by screwing one or two stop nuts onto the end.

According to a further development of the invention the device can also be used to achieve tightening of the screw means with a torque which exceeds the rated torque.

An embodiment of the invention is described below in more detail with reference to the accompanying drawing which shows an axial section through a screw joint with a torque nut according to the invention.

A screw 1 extends through a bore 3 in a plate 5. The screw carries a nut which is to be tightened with a predetermined torque. According to the invention the nut is a torque nut comprising an inner sleeve 7 which is screwed onto the screw 1 with an inner thread 9. The sleeve also has an outer thread 11 which has smaller pitch than the inner thread 9. A body 13 is screwed onto the outer thread 11. The body 13 has gripping surfaces 15 for working in conjunction with a tightening tool. The upper end of the sleeve 7 has a stop ring 17 formed by rolling, which grips into an annular groove 19 in the gripping body 13. The lower portion of the sleeve 7 widens conically to a foot 21 which lies against the plate 5. The surface of the cone forms an abutment surface 23 which faces towards but lies axially at a distance from a corresponding conical abutment surface 25 on the gripping body 13.

In manufacturing the torque nut the gripping body 13 is screwed onto the sleeve 7 whereafter the upper end of the sleeve is rolled to form the annular stop 17. The gripping body 13 is then screwed up against said stop, which then grips into the groove 19, and is tightened with a certain torque, which was previously determined by experiments with the thread pitch and material in question, to give the torque nut the desired rated torque. If, for example, the torque nut is to have the rated torque 20 kgm, the gripping body 13 is tightened against the stop 17 with the torque 20.2 kgm. The torque nut is thereby ready for use.

After the torque nut has been threaded on the screw, it is tightened with the help of a wrench which works in conjunction with the gripping surfaces 15 of the gripping body 13. When the rated torque of the torque nut is reached, the gripping body releases from the stop 17 and begins to be screwed downwards on the outer thread 11 of the sleeve 7. The gripping force between the gripping body 13 and the sleeve 7 loosens slowly but nevertheless distinctly noticeably. If for some reason it is desirable to perform the tightening with a larger torque than the rated torque of the torque nut, the gripping body 13 is screwed down on the sleeve 7 until the two conical surfaces 25 and 23 lie against each other. Tightening with the desired torque can then be made. By appropriate dimensioning one can also make the gripping means 13, when screwed down, press together the foot 21 of the sleeve 7 against the screw 1. The torque nut thereby functions as a lock nut.

The torque nut is loosened from the screw 1 by the gripping body 13 being screwed up on the outer thread 11 of the sleeve 7 to engagement with the stop 17 with a torque which exceeds the tightening torque.

What I claim is:

1. A torque-limiting gripping device for a screw or the like comprising: a screw means having an inner working thread and an outer thread, a gripping body having a thread which engages the outer thread and also having external gripping surfaces for receiving a tightening tool, a stop disposed on the screw means against which the gripping body engages with a predetermined pre-stress in the direction opposite to the direction for tightening the screw means so that when the screw means is tightened onto a screw by means of a tool engaging the gripping surfaces, torque is transferred from the gripping body to the screw means until the torque applied by the tool overcomes the pre-stress between the gripping body and the stop, whereafter the gripping body may be run down on the outer thread without transferring torque.

2. A device according to claim 1, characterized in that the screw means is the head portion of a screw, the head portion having said outer thread.

3. A device according to claim 1, characterized in that the screw means is a nut in the form of a sleeve having said inner working thread which engages a screw, the nut also being provided with other said outer thread.

4. A device according to claim 1, characterized in that said outer thread of the screw means has less of a pitch than the inner thread of said screw means.

5. A device according to claim 1, characterized in that the stop is disposed at the outer end of the screw means.

6. A device according to claim 5, characterized in that the stop comprises a conical thread portion of the outer thread of the screw means.

7. A device according to claim 5, characterized in that the stop comprises a bent or rolled over portion of the end of the screw means.

8. A device according to claim 7, characterized in that the gripping body end cooperating with the stop has an annular groove into which the stop is designed to engage.

9. A device according to claim 1, characterized in that the screw means and the gripping body have abutment surfaces lying axially at a distance from one another, said surfaces being arranged to cooperate with one another upon continued tightening of the screw means so as to transfer torque exceeding said predetermined value.

10. A device according to claim 9, characterized in that the abutment surfaces are conical surfaces, diverging towards the inner end of the screw means, of the ends of the gripping body and the screw means respectively which face away from the stop.

* * * * *